United States Patent [19]

Nozawa

[11] Patent Number: 5,539,537
[45] Date of Patent: Jul. 23, 1996

[54] FACSIMILE APPARATUS HAVING A WHITE-LINE SKIPPING FUNCTION

[75] Inventor: Masako Nozawa, Urawa, Japan

[73] Assignee: Kabushiki Kaisha Toshiba, Kawasaki, Japan

[21] Appl. No.: 220,260

[22] Filed: Mar. 30, 1994

[30] Foreign Application Priority Data

Mar. 31, 1993 [JP] Japan .................................. 5-073513

[51] Int. Cl.⁶ .............................. H04N 1/04; H04N 1/38; H04N 1/40
[52] U.S. Cl. .......................... 358/486; 358/463; 358/447; 358/464
[58] Field of Search ................................. 358/431, 463, 358/447, 486, 498, 464, 465, 466

[56] References Cited

U.S. PATENT DOCUMENTS 3,448,207 6/1969 Green et al. .
4,442,460 4/1984 Kurata et al. ............................ 358/296
5,151,794 9/1992 Kumagai ................................... 358/463

Primary Examiner—Edward L. Coles, Sr.
Assistant Examiner—Allan A. Esposo
Attorney, Agent, or Firm—Finnegan, Henderson, Farabow, Garrett & Dunner

[57] ABSTRACT

Before printing received image data, a facsimile apparatus performs a forcible white data converting operation on a predetermined range of the end regions of lines in the received image data, detects white lines having white data only from the image data subjected to the forcible white data converting operation, and performs the white-line skipping function and the ink donor film saving function based on the result of the white line detection.

18 Claims, 10 Drawing Sheets

FACSIMILE APPARATUS HAVING A WHITE-LINE SKIPPING FUNCTION

BACKGROUND OF THE INVENTION

1. Field of the Invention

The present invention relates to a facsimile apparatus having a printing function of received image data, and more particularly, to a facsimile apparatus having a white-line skipping function and an ink donor film saving function in printing received image data.

2. Description of the Related Art

Facsimile apparatus has various functions which includes a white-line skipping function for realizing high-speed printing and an ink donor film saving function for saving an ink donor film when printing received image data on copying paper.

The white-line skipping function is a function of increasing the speed of a paper feeding motor so as to increase the feeding speed of copying paper when there are successively present a predetermined number of lines which contain white data only (referred to as "white line" hereinafter) in the received image data, thereby to realize a high-speed printing of the received image data.

The ink donor film saving function is a function in a thermal transfer type facsimile apparatus using ink donor film for printing. With this function, when there is a white line in received image data, the white line is printed on copying paper without pressing the ink donor film against the copying paper, thereby to save the ink donor film.

These functions are performed on the basis of the received image data stored in a memory of a receiver-side facsimile apparatus.

Meanwhile, received image data stored in the memory of the facsimile apparatus may sometimes contain black data at the end regions of lines that are not contained in an original document in the sender side. Such black data are often generated due to an offset in the setting position of the original document in the sender-side facsimile apparatus.

In a situation where such black data are generated, the white-line skipping function and the ink donor film saving function cannot be performed effectively since a white line in an original document is not recognized as a white line in the receiver side due to black data generated at the end regions of the line in the received image data stored in the memory of receiver-side facsimile apparatus.

SUMMARY OF THE INVENTION

It is therefore an object of the present invention to provide a facsimile apparatus capable of effectively performing the white-line skipping function and the ink donor film saving function even when black data are generated at the end regions of lines in received image data due to an offset in the set position of original document in a sender-side facsimile apparatus.

The object is attained in a facsimile apparatus according to the present invention by performing a forcible white data converting operation which forcibly converts data in a predetermined range of end regions of lines in image data to be printed out into white data; by detecting a white line from the image data subjected to the white data converting operation and by printing the image data subjected to the white data converting operation while controlling the printing operation of the print means on the basis of the detection of the white line.

In the facsimile apparatus according to the present invention, even when an offset in the set position of an original document in a sender-side facsimile apparatus generates undesired black data in the received image data at end regions of lines, the white-line skipping function and the ink donor film saving function can be effectively performed.

DESCRIPTION OF THE PREFERRED EMBODIMENTS

Embodiments of a facsimile apparatus in accordance with the present invention will be described with reference to the attached drawings.

Figure 1:
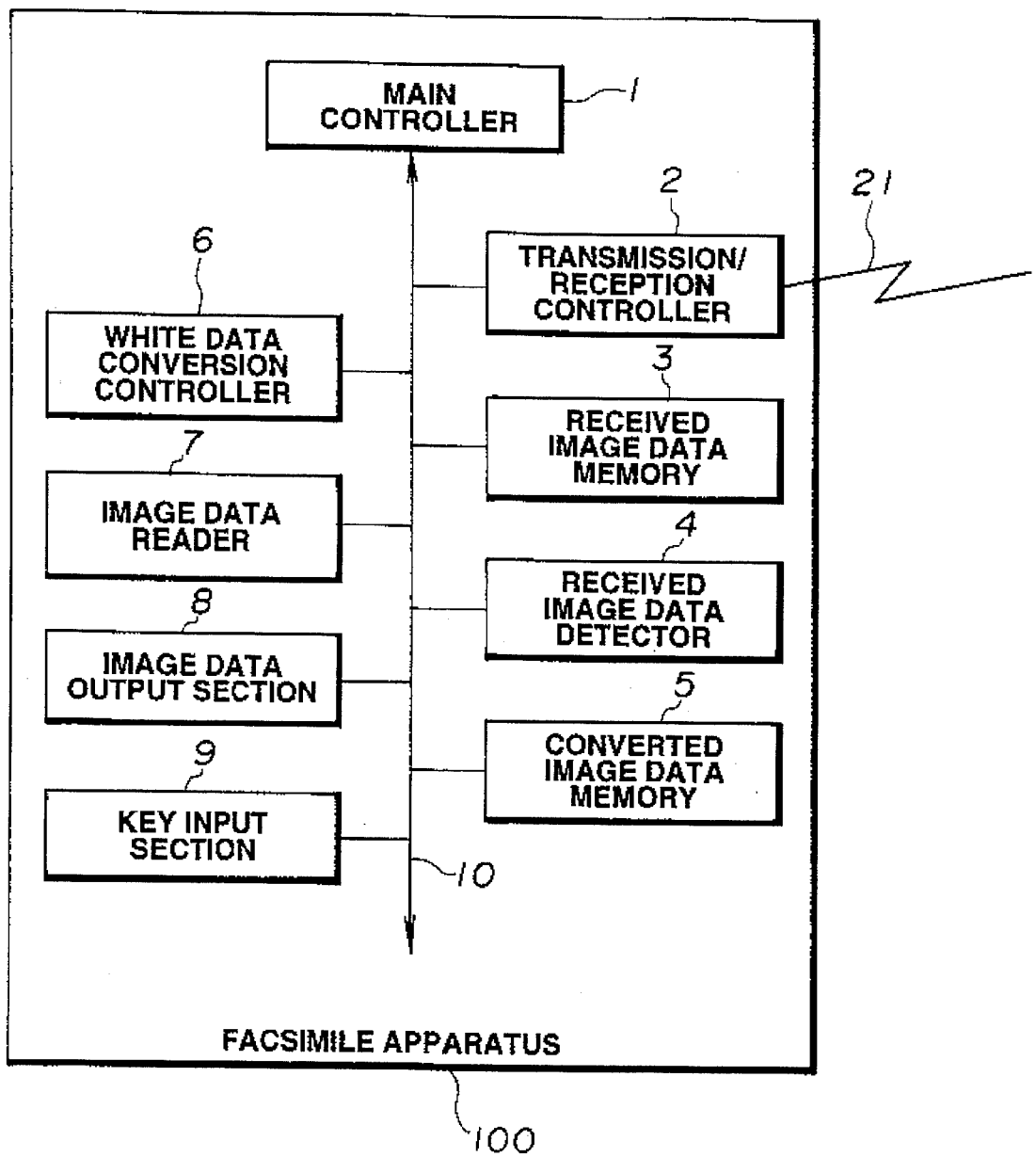
FIG. 1 is a block diagram of a facsimile apparatus in accordance with an embodiment of the present invention.

Referring to FIG. 1, a facsimile apparatus 100 comprises a main controller 1, a transmission/reception controller 2, a received image data memory 3, a received image data detector 4, a converted image data memory 5, a white data conversion controller 6, an image data reader 7, an image data output section 8, a key input section 9 and an internal bus 10 to which the components 1–9 are connected.

In the illustrated example, the main controller 1 acts to control the operation of the entire facsimile apparatus 100.

The transmission/reception controller 2, which is connected to a telephone line 21 under control of the main controller 1, controls reception of image data transmitted from the telephone line 21 and transmission of image data to the telephone line 21. The transmission/reception controller 2 contains a modem or codec which, at the time of transmitting/receiving the image data to/from a party-side facsimile apparatus (not shown) via the telephone line 21, performs protocol transfer with the party facsimile apparatus, demodulates and decodes the received image data or modulates and encodes image data for its transmission.

The received image data memory 3 is used to store therein image data received from the transmission/reception controller 2 under control of the main controller 1.

The image data reader 7 reads image data to be transmitted to another facsimile apparatus under control of the main controller 1.

The image data output section 8, which includes a printer using an ink donor film, outputs received image data, for example, in the form of a hard copy. In the illustrated example, the image data output section 8 has a white-line skipping function and in ink donor film saving function. The white-line skipping function and ink donor film saving function will be described later.

The key input section 9 enters therethrough various sorts of information necessary for controlling the facsimile apparatus 100, including, for example, a control signal for control of the operation of the facsimile apparatus 100 and a dial number of a destination party at the time of transmitting image data.

The arrangement mentioned above is the same as that of a conventional facsimile apparatus.

To effectively carry out the white-line skipping function and ink donor film saving function which are performed in the image data output section 8, the facsimile apparatus 100 of this embodiment is provided with an image data detector 4, a converted image data memory 5 and a white data conversion controller 6.

As mentioned above, in conventional facsimile apparatus, when there is an offset in the set position of an original document in a sender-side facsimile apparatus, the transmission/reception controller 2 may receive black data that are not present in the original document at the end regions of lines. The received image data containing such black data is stored in the received image data memory 3 and then outputted to the image data output section 8.

With such a conventional arrangement, even when the original document at the sender side contains a white line, the corresponding part in the received image data stored in the received image data memory 3 at the receiver side cannot be recognized as a white line due to the black data generated at end regions of the line. As a result, the white-line skipping function and ink donor film saving function of the image data output section 8 cannot be effectively performed.

For the purpose of removing undesired black data contained at the end regions of lines in the received image data, the white data conversion controller 6 is provided for converting the black data into white data.

Under control of the main controller 1, the white data conversion controller 6 successively detects line by line the image data stored in the received image data memory 3, and forcibly converts the data of the end regions of all lines in a predetermined range into white data.

The image data subjected to the white data conversion by the white data conversion controller 6 is stored in the converted image data memory 5. The image data output section 8 performs the image data outputting operation on the basis of the image data stored not in the received image data memory 3 but in the converted image data memory 5.

With such an arrangement, even when the transmission/reception controller 2 receives image data containing undesired black data at end regions of lines, the undesired black data are removed through the above-described white-data conversion, whereby the white-line skipping function and ink donor film saving function of the image data output section 8 can be effectively performed.

The operations of the respective parts of this embodiment will now be described.

Figure 2:
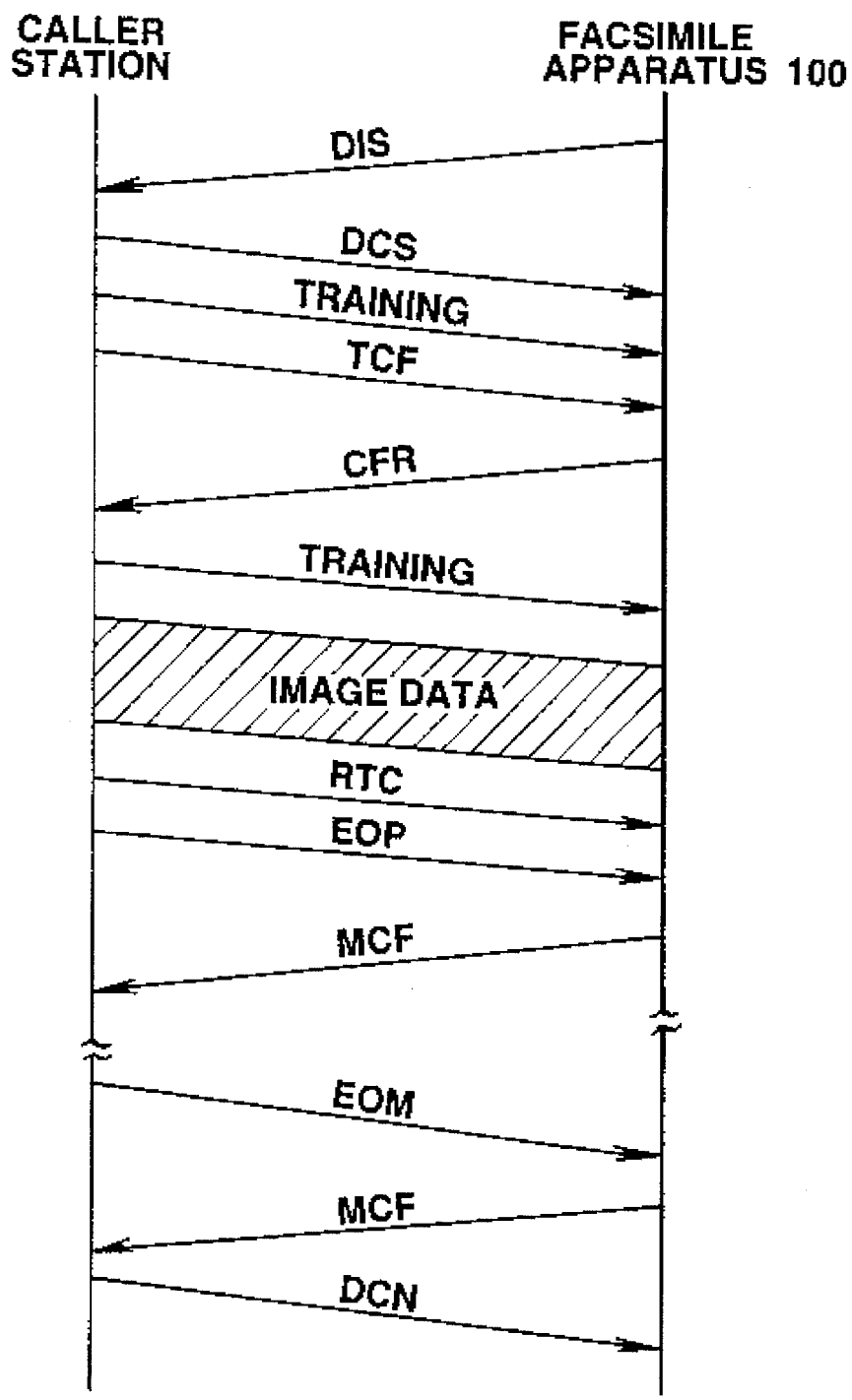
FIG. 2 is a sequence chart of facsimile communication procedures in a transmission/reception controller of the facsimile apparatus of FIG. 1 in receiving image data.

FIG. 2 illustrates the facsimile communication procedure of the transmission/reception controller 2 at the time of receiving image data. When the facsimile apparatus 100 of FIG. 1 is connected to a party facsimile apparatus (which will be referred to as caller station) through the telephone line 21 in response to a call from the caller station, signal transfer is carried out between the transmission/reception controller 2 and the caller station.

In the signal transfer, the facsimile apparatus 100 transmits to the caller station a digital identification signal (DIM signal) indicative of a function of the facsimile apparatus 100.

The caller station, when recognizing the DIM signal, transmits to the facsimile apparatus 100 a digital command signal (DCS signal) indicative of a function of the caller station, a training signal for preparation of transmission of image data and a training check signal (TCF signal).

The facsimile apparatus 100, when recognizing the DCS and TCF signals, puts itself in a communication mode and sends from the receiver-side transmission/reception controller 2 to the caller station a confirmation-to-receive signal (CFR signal) indicative of being ready for the reception of the image data.

The caller station, when recognizing the CFR signal, performs its training operation to get ready for transmitting the image data to the facsimile apparatus 100 and then starts transmission of the image data.

The caller station, after transmitting part of the image data corresponding to one page to the facsimile apparatus 100, sends to the facsimile apparatus 100 a return-to-control signal (RTC signal) indicative of the completed transmission of the one-page image data from the caller station and a multi-page signal (MPS signal), and terminates its transmitting operation of the one-page image data.

The facsimile apparatus 100, when normally receiving one page of the image data, issues to the caller station a message confirmation signal (MCF signal) indicative of the completion of transmission of the one-page image data and terminates its receiving operation of the one-page image data.

To transmit a plurality of pages of the image data, the caller station sends the training signal, the image data, RTC and MPS signals to the facsimile apparatus 100 and the facsimile apparatus 100 sends MCF to the caller station as explained above, and this precedures are repeated according to the number of pages. When completing the transmission of all the image data, the caller station sends an end-of-message signal (EOM signal) indicative of end of transmission of all the image data to the facsimile apparatus 100.

When recognizing the EOM signal, the facsimile apparatus 100 sends the MCF signal to the caller station. The caller station, when recognizing the MCF signal, sends the facsimile apparatus 100 a line disconnect command signal (DCN signal) indicative of disconnection of the telephone line 21 and disconnects the telephone line.

Figure 3:
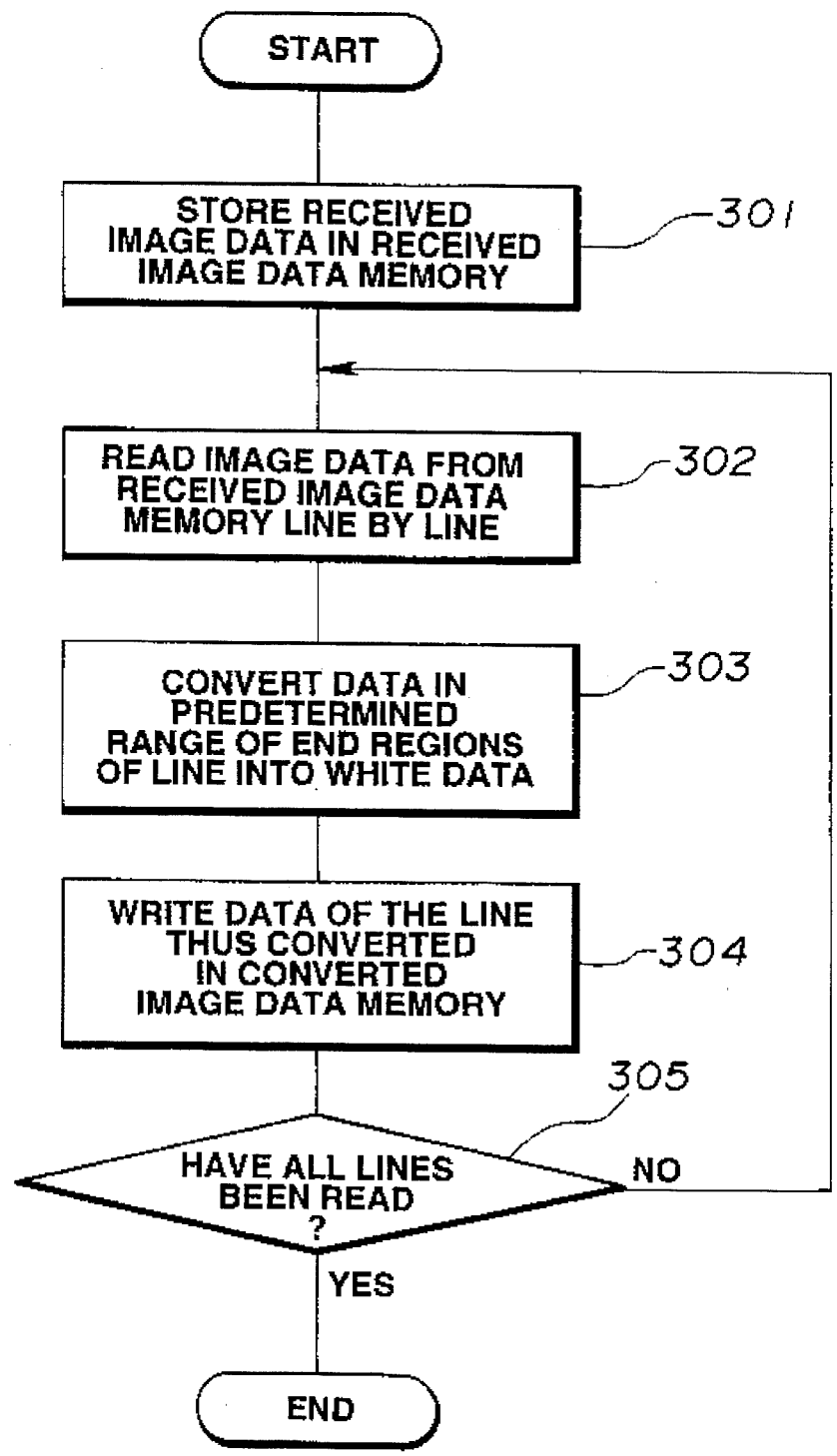
FIG. 3 is a flowchart for illustrating the white data converting operation of the facsimile apparatus of FIG. 1.

FIG. 3 illustrates the steps of the white data converting operation in which forcibly converts into white data a predetermined range of end regions of all lines of the received image data stored in the received image data memory 3.

Referring to FIG. 3, the image data received at the transmission/reception controller 2 is stored in the received image data memory 3 (step 301). Then, the image data detector 4 detects and reads out the first line of the received image data from the received image data memory 3 (step 302).

The first line image data is sent to the white data conversion controller 6 where the data in the end regions of the first line image data are forcibly converted into white data (step 303).

The number of bits of one line and the number of bits of the end regions can be arbitrarily set as necessary. For example, one-line data of the received image data consists of 1728 bits and the end regions, i.e., both ends of a line in the predetermined range, each consists of 32 bits which is 4 mm long.

Whether black data are contained in the end regions is examined and if black data are contained in the end regions, the facsimile apparatus forcibly converts the black data into white data.

When the forcible conversion of the end-region data of the one-line image data into the white data is completed by the white data conversion controller 6, the one-line image data thus converted is transferred to the converted image data memory 5 to be written therein (step 304).

Then, it is examined as to whether all the lines of the received image data of the received image data memory 3 have been read out therefrom, i.e., the image data detector 4 has detected all the lines of the received image data of the received image data memory 3 (step 305).

When not all the lines have been read from the received image data, the control returns to the step 302, in which data of the next line, i.e., the second line data is read from the received image data memory 3. The end portions of of the second line data are forcibly converted into white data (step 303) and the second line data subjected to the white data conversion is stored into the converted image data memory 5 (step 304).

The above operation is repeated until it is judged in the step 305 that all the lines of the received image data has been read out from the received image data memory 3. When it is judged in the step 305 that all the lines of the received image data has been read out, this operation is terminated.

As a result of the white data conversion, the end-region data of the all lines of the image data of the received image data memory 3 are forcibly converted into white data and then written into the converted image data memory 5.

Figure 4:
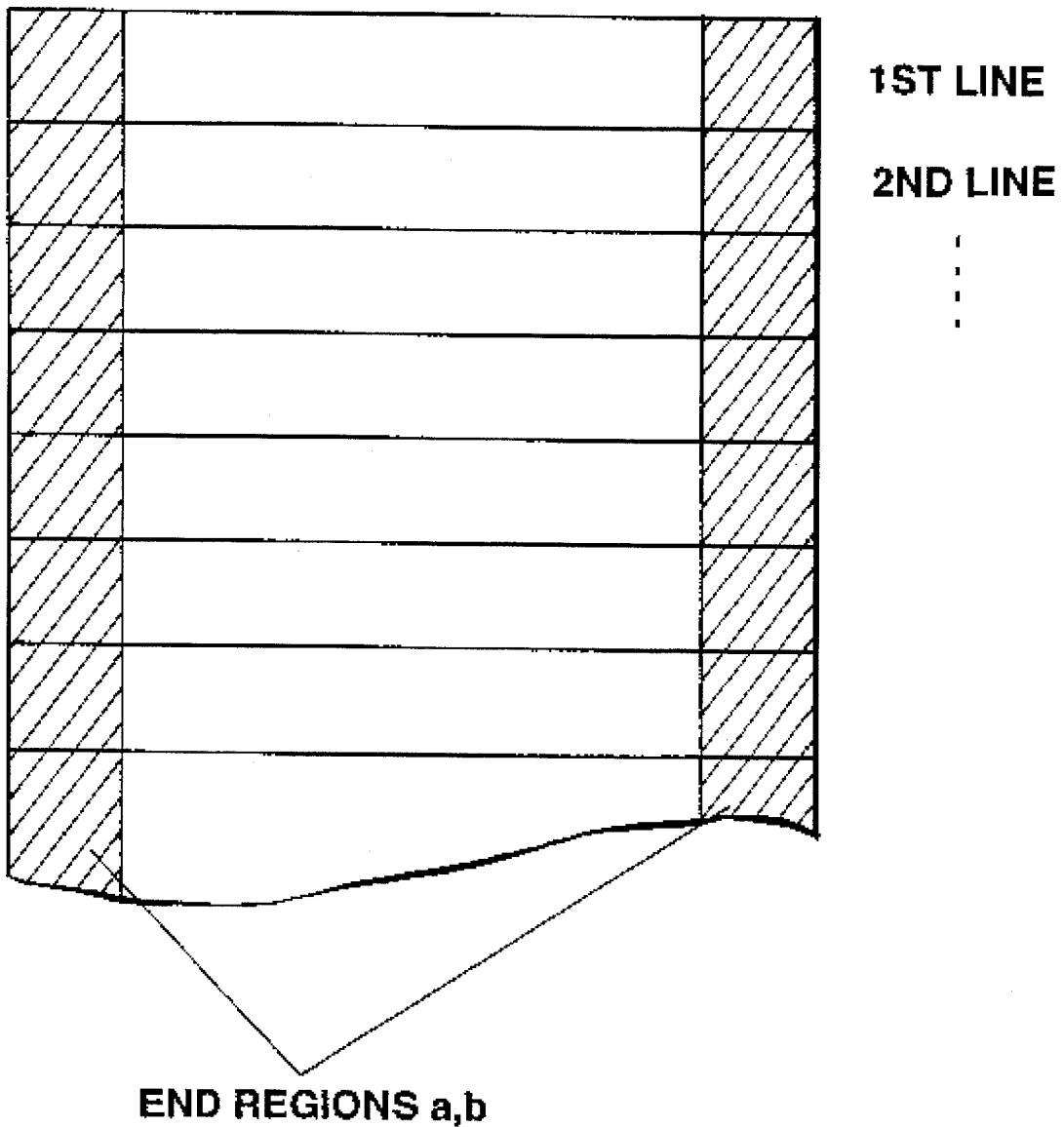
FIG. 4 is a diagram for illustrating image data converted through the white data converting operation of FIG. 3 to be stored in a converted image data memory.

FIG. 4 shows image data stored in the converted image data memory 5 through the white data conversion. As shown in FIG. 4, the image data stored in the converted image data memory 5 have been all subjected to forcible white data conversion at the end regions a and b, so that, even when image data containing undesired black data at the end regions of lines is received at the transmission/reception controller 2, undesired black data can be completely eliminated in the converted image data memory.

Figure 5:
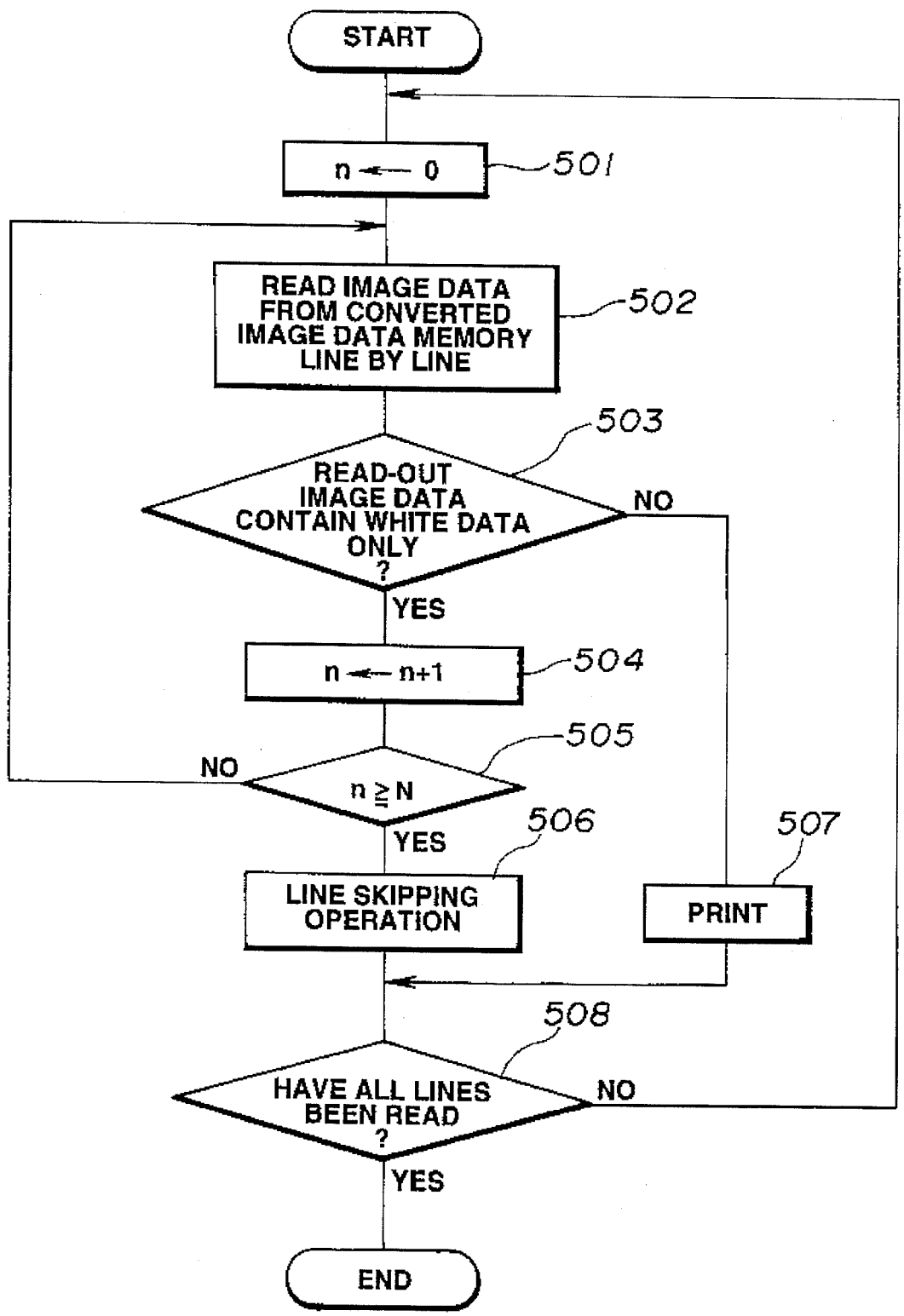
FIG. 5 is a flowchart for illustrating an example of the operation of a white-line skipping function of an image data output section in FIG. 1.

FIG. 5 is a flowchart for explaining an example of operation of the white-line skipping function of the image data output section 8 in FIG. 1.

In the flowchart of FIG. 5, when it is desired to print the received image data and there are a predetermined continuous number N of white lines in the received image data, the image data output section 8 increase the driving speed of a feed motor (not shown) to cause fast feeding of the paper and skipping of the N white lines. This white line skipping operation is carried out on the basis of the image data of the converted image data memory 5 obtained through the white data conversion explained in connection with FIGS. 3 and 4.

That is, the image data output section 8 first clears a count value n of continuous white lines to zero (step 505), reads out the first line image data from the converted image data memory 5 (step 502), and then examines whether the first line image data is all white data (step 503).

If the first line image data read out from the converted image data memory 5 is not all white data, then the image data output section 8 proceeds to a step 507 to perform printing operation of the associated line. Next, the image data output section 8 goes to a step 508 to examine whether all the lines have been read from the converted image data memory 5. If not all the lines have been read from the converted image data memory 5, the image data output section 8 returns to the step 501.

When it is judged in the step 503 that image data for one line read out from the converted image data memory 5 is all white data, the image data output section 8 increments the value n by one (n←n+1) (step 504) and then examines whether the value n has reached the preset value N (n≧N) (step 505). When the value n has not reached the preset value N, the image data output section 8 returns to the step 502 and repeats the processing of from the step 502 to the step 505 until a relationship of n≧N is satisfied.

When it is judged that the relationship of n≧N is satisfied, the image data output section 8 increase the rotational speed of the feed motor (not shown) to cause fast feeding of the paper to skip the N white lines (step 506).

The image data output section 8 then examines whether all the lines have been read from the converted image data memory 5 (step 508). When not all the lines have been read from the converted image data memory 5, the image data output section 8 returns to the step 501.

Through the operation as described above, when the original document contains the predetermined number N of white lines, the feed motor for feeding the copying paper in the sub-scanning or feed direction is put in the fast feed mode to realize the skipping of the N white lines.

When the white line skipping operation is carried out, the received image data is subjected to the forcible white data conversion at all the end regions a and b as shown in FIG. 4. Therefore, even when the transmission/reception controller 2 receives image data containing undesired black data at the end regions of lines, such black data can be effectively removed through the white line skipping operation.

Figure 6:
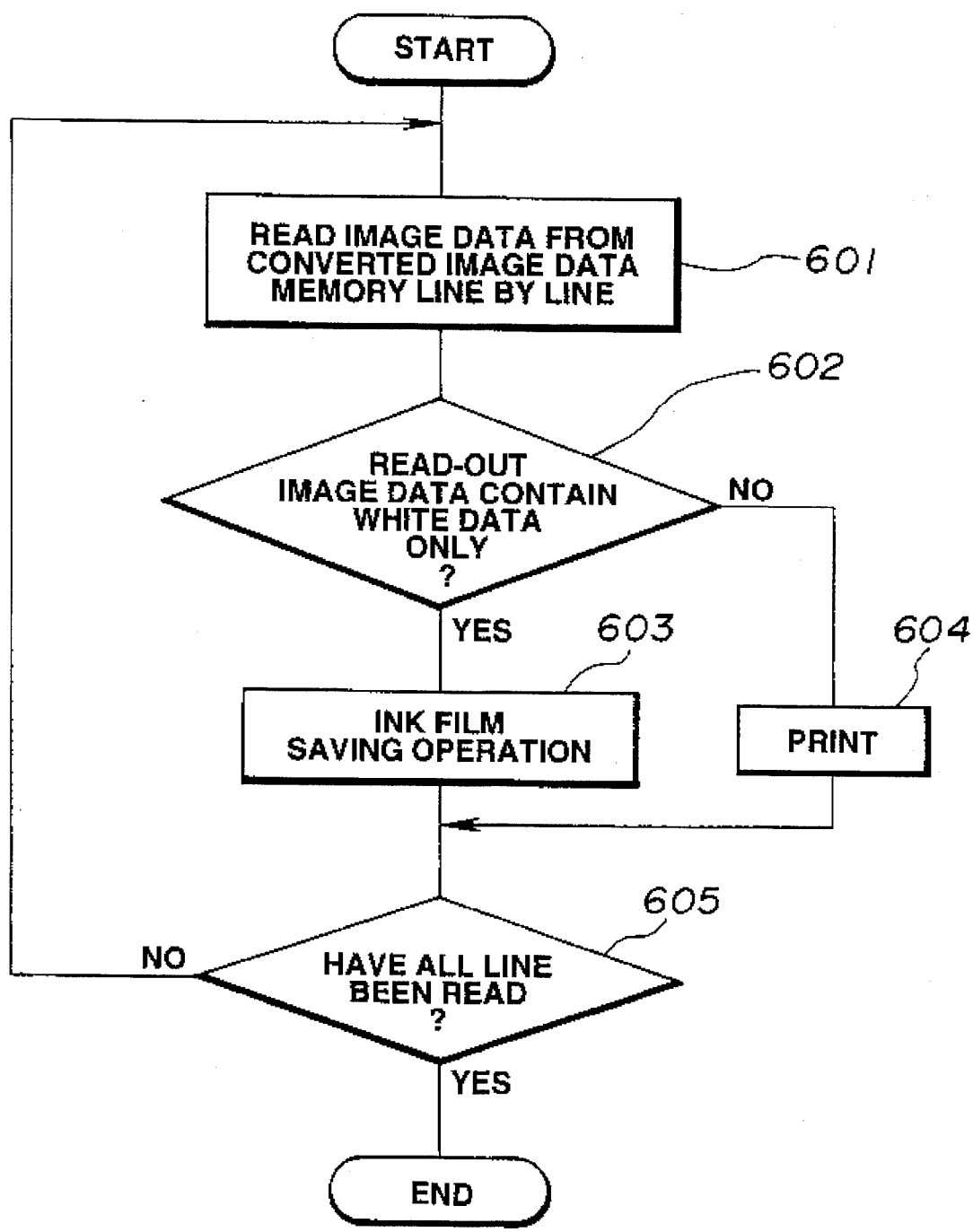
FIG. 6 is a flowchart for illustrating an example of operation of an ink donor film saving function of the image data output section in FIG. 1.

FIG. 6 shows a flowchart for explaining the operation of the ink donor film saving function of the image data output section 8 in FIG. 1.

The ink donor film saving function is intended for use in a thermal transfer type of printer in hich printing is performed with use of a thermal head and ink donor film. In this case, if there is a white line in an original document, the printing of the white line is carried out without pressing the ink donor film against copying paper (not shown), thus realizing saving of the ink donor film. This operation is carried out based on the image data subjected to the white data conversion.

That is, the image data output section 8 first reads out the first line data from the converted image data memory 5 (step 601) and examines whether the read-out first line image data is all white data (step 602).

If it is judged that the first line image data is not all white data, the image data output section 8 proceeds to a step 604 to perform printing operation of the associated line. Next, the output section 8 examines whether all the lines have been read from the converted image data memory 5 (step 605).

When it is jugded that not all the lines have been read from the converted image data memory 5, the output section 8 returns to the step 601.

When it is judged in the step 602 that the first line image data read out from the converted image data memory 5 is all white data, the image data output section 8 performs the ink donor film saving operation to print the associated line without pressing the ink donor film against the copying paper (not shown) (step 603).

Next, the image data output section 8 examines whether all the lines have been read from the converted image data memory 5 (step 604). When it is judged that not all the lines have been read from the converted image data memory 5, the output section 8 returns to the step 601.

Through the operation, if a white line exits in the original document, the ink donor film saving function of printing the white line without using the ink donor film can be realized.

In the ink donor film saving function, in this embodiment, the received image data is subjected to the forcible white data conversion at all the end regions a and b as shown in FIG. 4. Thus, even when image data containing undesired black data at the end regions of lines is received at the transmission/reception controller 2, the ink donor film saving function can be effectively realized.

Figure 7:
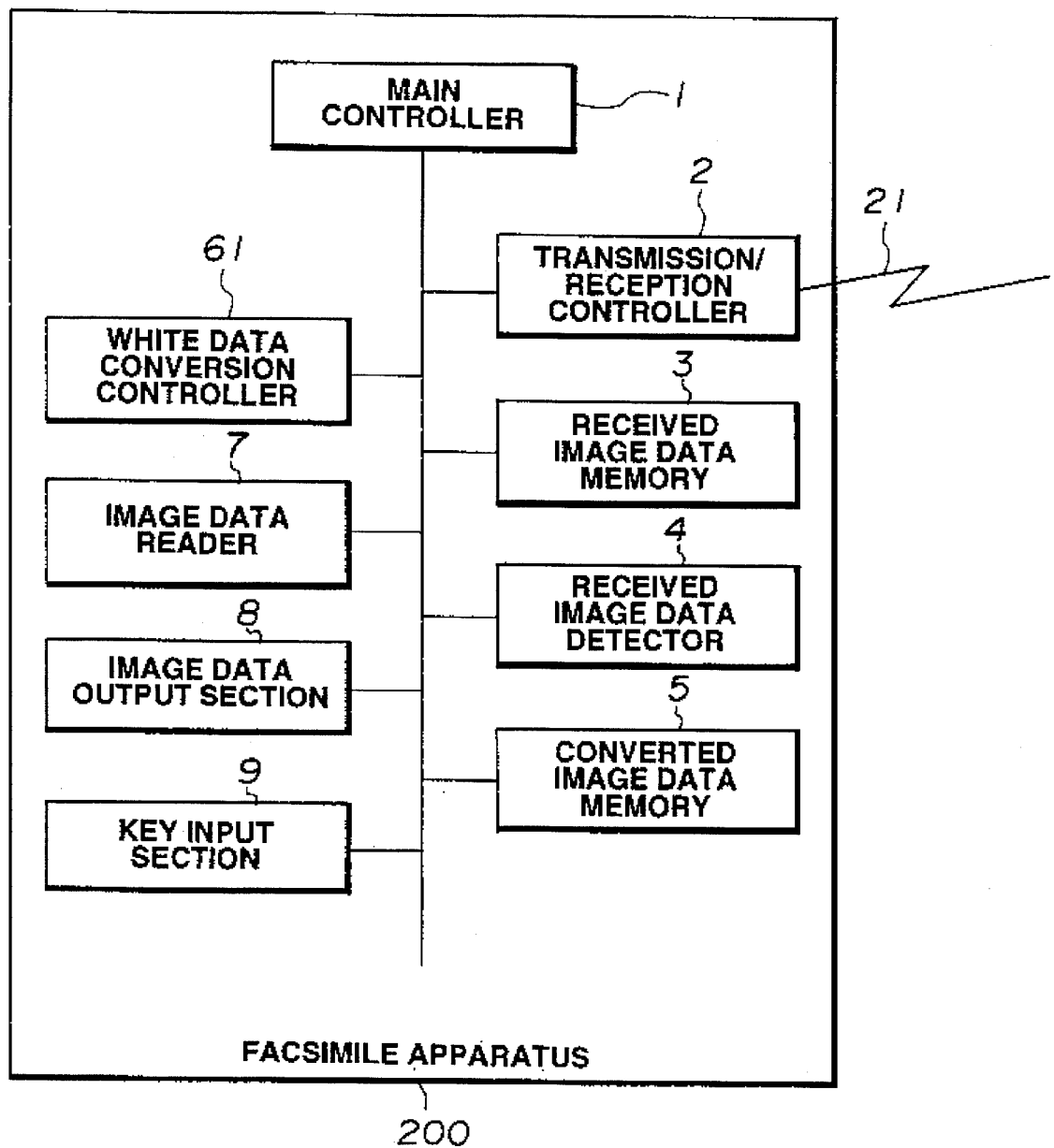
FIG. 7 is a block diagram of a facsimile apparatus in accordance with another embodiment of the present invention.

Shown in FIG. 7 is a facsimile apparatus in accordance with another embodiment of the present invention. For the purpose of removing undesired black data contained at the end regions of lines of the received image data, the facsimile apparatus 100 of the embodiment of FIG. 1 is arranged to forcibly convert into white data all the line data of the image data of the received image data memory 3 at the end regions in the predetermined ranges; whereas, a facsimile apparatus 200 of this embodiment shown in FIG. 7 is arranged to detect lines having all white data except for the end regions from the image data of the received image data memory 3 and to forcibly convert into white data the end-region data of these lines alone in the predetermined ranges.

In other words, for the purpose of effectively performing the white-line skipping function or ink donor film saving function, it is sufficient for only the lines of the image data of the received image data memory 3 having all white data except for the end regions to be subjected to the forcible white data conversion at their end regions in the predetermined ranges. From the above viewpoint, the embodiment of FIG. 7 is arranged.

In the explanation in connection with FIG. 7, constituent elements having substantially the same functions as those in the embodiment of FIG. 1 are denoted by the same reference numerals, and explanation thereof is omitted.

In FIG. 7, a white data conversion controller 61, under control of the main controller 1, performs its forcible white data converting operation by causing the image data detector 4 to sequentially detect line data from the stored image data of the received image data memory 3 and to forcibly convert the end-region data of all lines of the image data of the received image data memory 3 in the predetermined ranges, but the white data conversion is carried out with respect to only the lines of the image data having all white data except for their end regions.

Other arrangement is substantially the same as that of FIG. 1 and thus explanation will be made as to only the operation of the white data conversion controller 61.

Figure 8:
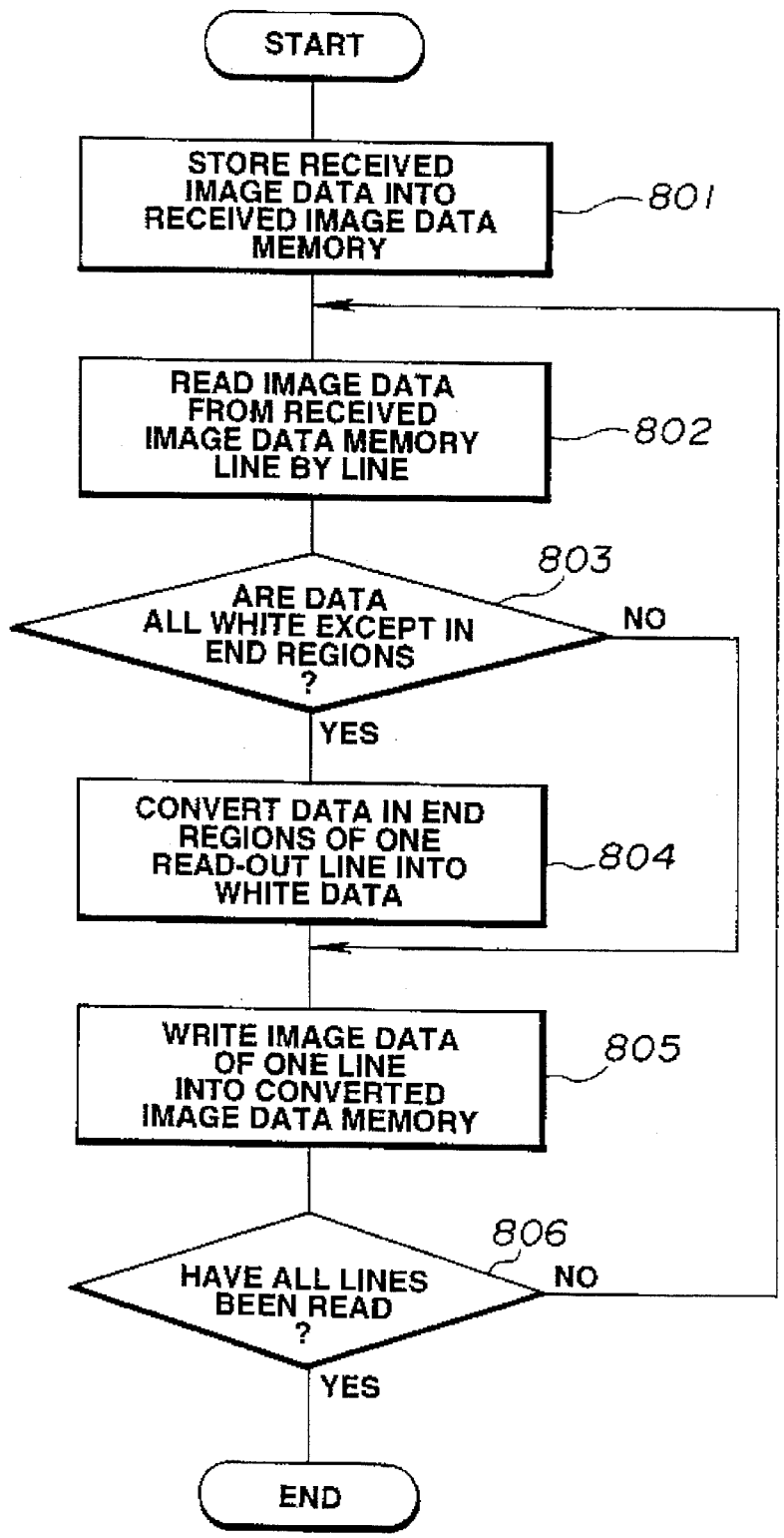
FIG. 8 is a flowchart for illustrating the white data converting operation of the facsimile apparatus of FIG. 7.

Referring to FIG. 8, the image data received at the transmission/reception controller 2 in FIG. 7 is first stored in the received image data memory 3 (step 801). Then the image data detector 4 detects and reads out one line data from the stored image data of the received image data memory 3 (step 802).

Figure 9:
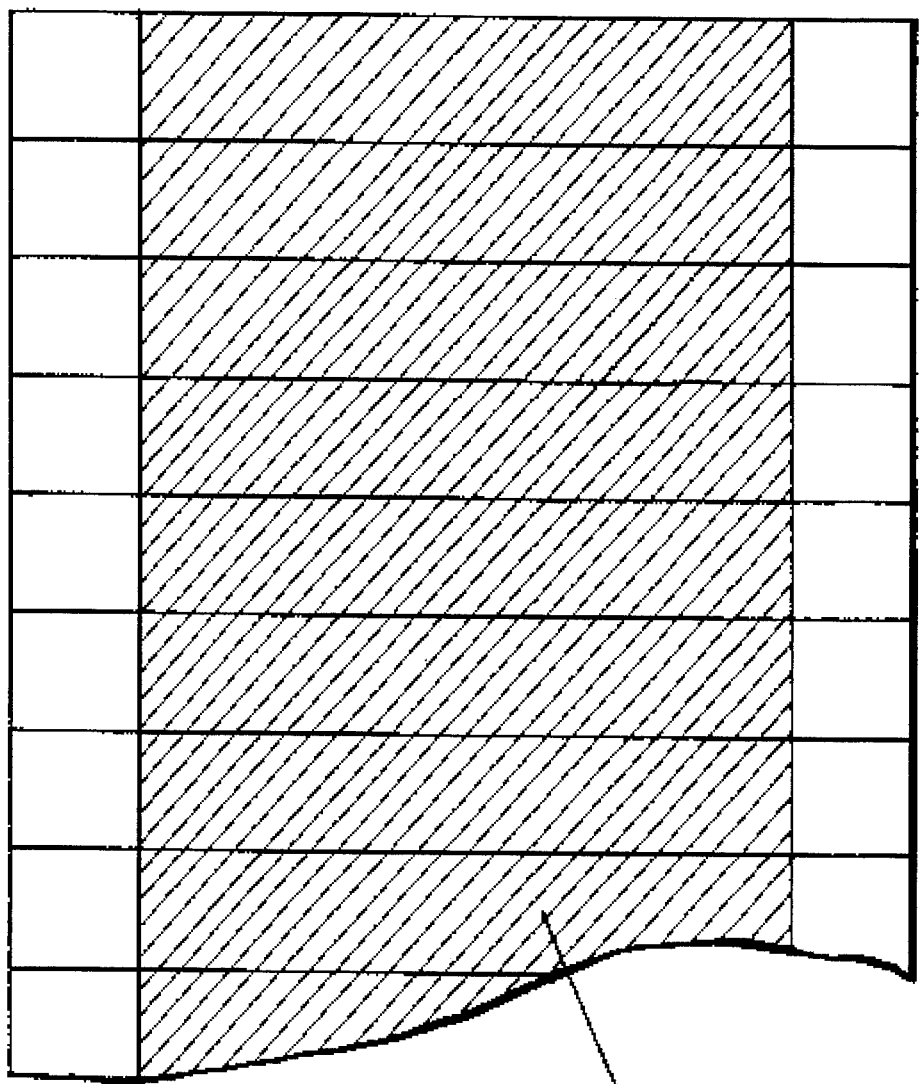
FIG. 9 is a diagram for illustrating image data to be checked in the white data converting operation of FIG. 8.

Next, the one-line image data is subjected to an examination of whether data except for its end regions is all white data (step 803). That is, as shown in FIG. 9, data except for its preset end regions, i.e., such data as shown by a hatched area is examined with respect to whether to have all white data.

If it is determined that the data except for the end regions is all white data, then the end-region data of the image data in the predetermined ranges are subjected to the forcible white data conversion (step 804). This conversion is substantially the same as that of the step 303 in FIG. 3.

After completion of the operation of the step 804, a resultant one-line image data is stored into the converted image data memory 5 (step 805).

When it is judged in the step 803 that the data except for the end regions is not all white data, the control proceeds to the step 805 without executing the operation of the step 804 and the one-line image data is stored into the converted image data memory 5 as it is.

Next, it is examined whether all the lines of the received image data of the memory 3 have been read out therefrom (step 806). Determination of all the lines having not read out from the memory 3 causes the control to return to the step 802.

The above operation is repeated until it is judged that all the lines of the received image data have been read out from the memory 3. When it is judged in the step 806 that all the lines of the received image data have been read out from the memory 3, the processing is terminated.

Through the white data converting operation, the stored image data of the received image data memory 3 is subjected to the forcible white data conversion with respect to all the lines each having all white data except for their end regions in the predetermined ranges.

Figure 10:
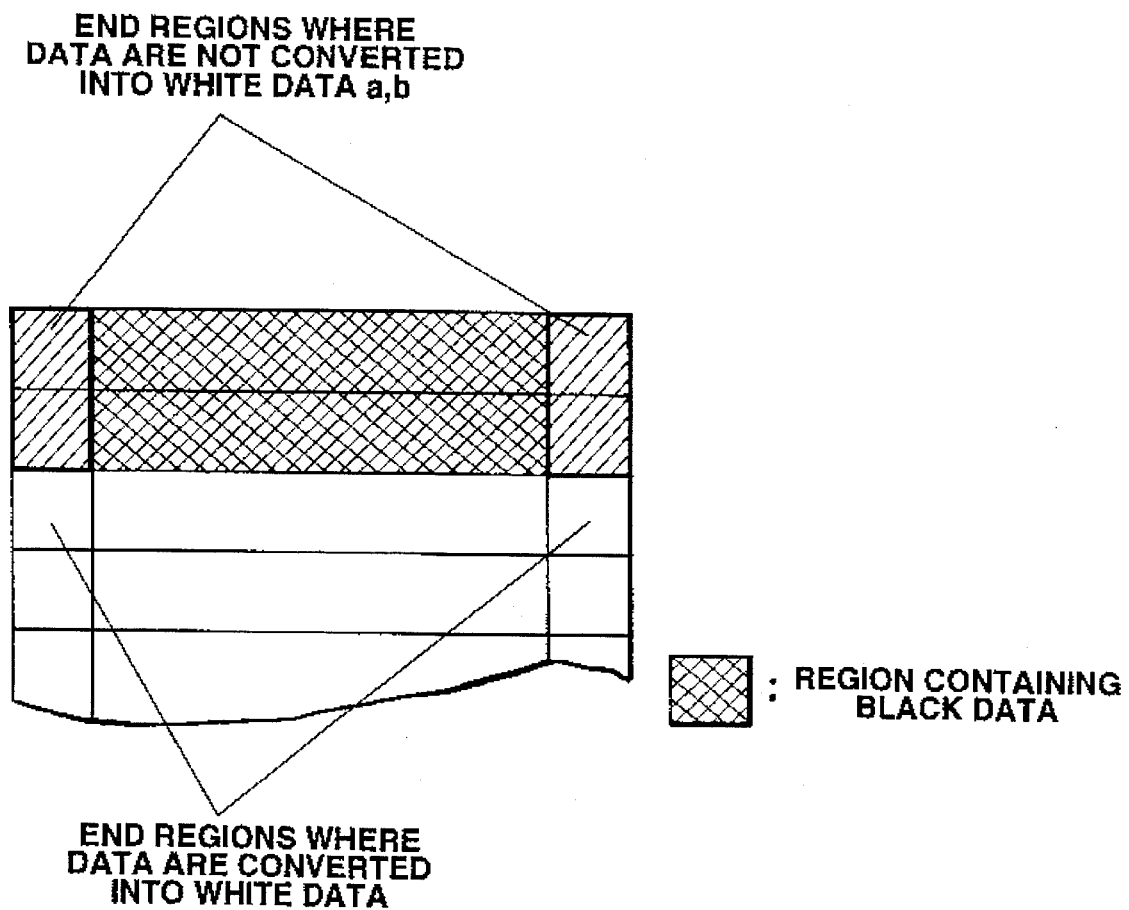
FIG. 10 is a diagram for illustrating image data converted through the white data converting operation of FIG. 8 to be stored in a converted image data memory.

FIG. 10 shows image data stored in the converted image data memory 5 and subjected to the above white data conversion. As shown in FIG. 10, only line data of the stored image data of the converted image data memory 5 having all white data except for their end regions are subjected to the forcible white converting operation with respect to their end regions of the predetermined ranges, while the other line data not having all white data except for their end regions are subjected to no conversion.

With such an arrangement, a necessary white data conversion time can be shortened and as in the embodiment of FIG. 1, the white-line skipping function and ink donor film saving function of the image data output section 8 can be effectively performed.

Although explanation has been made in connection with the case where the image data detector 4 detects one line of the image data in the foregoing embodiments, the present invention is not restricted to the one line image data but the image data detector 4 may detect a plurality of lines of or a predetermined lines of the image data with substantially the same effects as the foregoing embodiments.

Further, explanation has been made in connection with the case where the image data detector detects one line of the stored image data of the received image data memory corresponding to 1728 bits and the end regions a and b thereof correspond respectively to 4 mm or 32 bits in the foregoing embodiments. However, the present invention is not limited to the specific values.

In addition, although the received image data memory 3 for storing the received image data is provided separately from the converted image data memory 5 for storing the image data subjected to the white data conversion in the foregoing embodiment, the memories 3 and 5 may be provided as a single memory.

The foregoing embodiments have been explained in connection with the case where the facsimile apparatus is used as a receiver. However, the facsimile apparatus of the present invention may be used as a transmitter for transmitting image data entered from the image data reader 7 through operator's operation of the key input section 9 via the telephone line 21.

What is claimed is:

1. A facsimile apparatus comprising:

image data processing means for performing a forcible white data converting operation which forcibly converts data in a predetermined range of end regions of lines in image data to be printed out into white data;

white line detecting means for detecting white lines each having white data only from the image data subjected to the white data converting operation by the image data processing means;

print means for printing the image data subjected to the white data converting operation; and print control means for controlling printing operation of the print means based on a detection output of the white line detecting means wherein, when the white line detecting means detects a white line, the print control means performs a line skipping operation for skipping the white line in the print means.

2. A facsimile apparatus as set forth in claim 1, wherein the image data processing means performs the forcible white data converting operation on the predetermined range of the end regions for all lines in the image data to be printed out.

3. A facsimile apparatus as set forth in claim 1, wherein the image data processing means performs the forcible white data converting operation on the predetermined range of the end regions only for lines in the image data to be printed out having white data only except for the end regions of the predetermined ranges.

4. A facsimile apparatus comprising:

image data processing means for performing a forcible white data converting operation which forcibly converts data in a predetermined range of end regions of lines in image data to be printed out into white data;

white line detecting means for detecting white lines each having white data only from the image data subjected to the white data converting operation by the image data processing means;

print means for printing the image data subjected to the white data converting operation; and print control means for controlling printing operation of the print means based on a detection output of the white line detecting means wherein, when the white line detecting means detects a white line, the print control means performs a print inhibiting operation for inhibiting printing of the white line by the print means.

5. A facsimile apparatus as set forth in claim 4, wherein the image data processing means performs the forcible white data converting operation on the predetermined range of the end regions for all lines in the image data to be printed out.

6. A facsimile apparatus as set forth in claim 4, wherein the image data processing means performs the forcible white data converting operation on the predetermined range of the end regions only for lines in the image data to be printed out having white data only except for the end regions of the predetermined ranges.

7. A facsimile apparatus comprising:

image data processing means for performing a forcible white data converting operation which forcibly converts data in a predetermined range of end regions of lines in image data to be printed out into white data;

white line detecting means for detecting white lines each having white data only from the image data subjected to the white data converting operation by the image data processing means;

print means for printing the image data subjected to the white data converting operation; and print control means for controlling printing operation of the print means based on a detection output of the white line detecting means wherein, the print means performs printing operation with use of ink donor film and when the white line detecting means detects a white line, the print control means performs ink donor film saving operation for inhibiting printing with use of the ink donor film.

8. A facsimile apparatus as set forth in claim 7, wherein the image data processing means performs the forcible white data converting operation on the predetermined range of the end regions for all lines in the image data to be printed out.

9. A facsimile apparatus as set forth in claim 7, wherein the image data processing means performs the forcible white data converting operation on the predetermined range of the end regions only for lines in the image data to be printed out having white data only except for the end regions of the predetermined ranges.

10. A facsimile apparatus comprising:

received image data memory means for storing received image data therein;

image data scanning means for scanning the image data stored in the received image data memory means;

image data processing means, in response to scanning of the received image data by the image data scanning means, for performing white data converting operation to forcibly convert data in a predetermined range of end regions of each line scanned by the image data scanning means into white data;

converted image data memory means for storing the image data subjected to the white data converting operation by the image data processing means;

print means for printing the image data stored in the converted image data memory means; and print control means for controlling printing operation of the print means based on a detection output of the white line detecting means wherein, the print means includes a head for printing image data on copying paper, the printing of the image data in a main scanning direction being performed by moving the printing head in the main scanning direction, the printing of the image data in a sub-scanning direction being performed by moving the copying paper in the sub-scanning direction feeding direction with respect to the printing head, and wherein, when the white line detecting means detects a white line, the print control means performs a line skipping operation for fast-feeding the copying paper in the sub-scanning direction.

11. A facsimile apparatus as set forth in claim 10, wherein the image data processing means performs the forcible white data converting operation on the predetermined range of the end regions for all lines in the image data to be printed out.

12. A facsimile apparatus as set forth in claim 10, wherein the image data processing means performs the forcible white data converting operation on the predetermined range of the end regions only for lines in the image data to be printed out having white data only except for the end regions of the predetermined ranges.

13. A facsimile apparatus comprising:

received image data memory means for storing received image data therein;

image data scanning means for scanning the image data stored in the received image data memory means;

image data processing means, in response to scanning of the received image data by the image data scanning means, for performing white data converting operation to forcibly convert data in a predetermined range of end regions of each line scanned by the image data scanning means into white date;

converted image data memory means for storing the image data subjected to the white data converting operation by the image data processing means;

print means for printing the image data stored in the converted image data memory means; and print control means for controlling printing operation of the print means based on a detection output of the white line detecting means wherein, the print means includes a printing head for printing image data on copying paper, the printing of the image data in a main scanning direction being performed by moving the printing head in the main scanning direction, the printing of the image data in a sub-scanning direction being performed by moving the copying paper in the sub-scanning direction feeding direction with respect to the printing head, and wherein, when the white line detecting means detects a white line, the print control means performs a paper feed inhibiting operation to inhibit the feeding of the copying paper in the sub-scanning direction.

14. A facsimile apparatus as set forth in claim 13, wherein the image data processing means performs the forcible white data converting operation on the predetermined range of the end regions for all lines in the image data to be printed out.

15. A facsimile apparatus as set forth in claim 13, wherein the image data processing means performs the forcible white data converting operation on the predetermined range of the end regions only for lines in the image data to be printed out having white data only except for the end regions of the predetermined ranges.

16. A facsimile apparatus comprising:

received image data memory means for storing received image data therein;

image data scanning means for scanning the image data stored in the received image data memory means;

image data processing means, in response to scanning of the received image data by the image data scanning means, for performing white data converting operation to forcibly convert data in a predetermined range of end regions of each line scanned by the image data scanning means into white date;

converted image data memory means for storing the image data subjected to the white data converting operation by the image data processing means;

print means for printing the image data stored in the converted image data memory means; and print control means for controlling printing operation of the print means based on a detection output of the white line detecting means wherein, the print means includes a printing head for printing image data on copying paper with use of ink donor film, the printing of the image data in a main scanning direction being performed by moving the printing head in the main scanning direction, the printing of the image data in a sub-scanning direction being performed by moving the copying paper in the sub-scanning direction feeding direction with respect to the printing head, and wherein, when the white line detecting means detects a white line, the print control means performs an ink donor film saving operation to inhibit the printing with use of the ink donor film.

17. A facsimile apparatus as set forth in claim 16, wherein the image data processing means performs the forcible white data converting operation on the predetermined range of the end regions for all lines in the image data to be printed out.

18. A facsimile apparatus as set forth in claim 16, wherein the image data processing means performs the forcible white data converting operation on the predetermined range of the end regions only for lines in the image data to be printed out having white data only except for the end regions of the predetermined ranges.

* * * * *